(12) United States Patent
Schmidt

(10) Patent No.: US 10,435,077 B2
(45) Date of Patent: Oct. 8, 2019

(54) VEHICLE SENSOR CLEANING

(71) Applicant: Ford Global Technologies, LLC, Dearborn, MI (US)

(72) Inventor: David J. Schmidt, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 36 days.

(21) Appl. No.: 15/825,641

(22) Filed: Nov. 29, 2017

(65) Prior Publication Data

US 2019/0161125 A1 May 30, 2019

(51) Int. Cl.
| | | |
|---|---|---|
| *B62D 25/07* | (2006.01) | |
| *B60S 1/56* | (2006.01) | |
| *B60S 1/46* | (2006.01) | |
| *G02B 27/00* | (2006.01) | |

(52) U.S. Cl.
CPC ............. *B62D 25/07* (2013.01); *B60S 1/46* (2013.01); *B60S 1/566* (2013.01); *B60S 1/56* (2013.01); *G02B 27/0006* (2013.01)

(58) Field of Classification Search
CPC ... B60S 1/56; B60S 1/566; B60S 1/46; B62D 25/07; G02B 27/0006; B60R 2300/301; B60W 2420/52; G01S 17/936
USPC ........ 296/208, 213, 96.15, 96.17; 239/284.1, 239/120; 15/250.01
See application file for complete search history.

(56) References Cited

U.S. PATENT DOCUMENTS

| | | | | |
|---|---|---|---|---|
| 4,844,532 A | * | 7/1989 | Ono | B60J 7/043 296/213 |
| 5,046,779 A | * | 9/1991 | Ichinose | B60J 7/05 296/213 |
| 7,866,739 B2 | | 1/2011 | Thiele | |
| 2009/0108636 A1 | * | 4/2009 | Hanson | B62D 33/0625 296/213 |
| 2009/0167062 A1 | * | 7/2009 | Greif | B60J 7/0061 296/213 |
| 2010/0019544 A1 | * | 1/2010 | Thiele | B29C 53/20 296/213 |
| 2016/0244028 A1 | * | 8/2016 | Wakatsuki | B60S 1/566 |
| 2016/0274589 A1 | * | 9/2016 | Templeton | G05D 1/0246 |
| 2018/0011173 A1 | * | 1/2018 | Newman | G01S 17/936 |
| 2018/0257582 A1 | * | 9/2018 | Fan | B60R 11/04 |
| 2018/0265048 A1 | * | 9/2018 | Schmidt | B60S 1/542 |
| 2018/0272998 A1 | * | 9/2018 | Schmidt | B08B 3/02 |
| 2018/0293458 A1 | * | 10/2018 | Makarewicz | G06T 7/80 |
| 2018/0354468 A1 | * | 12/2018 | Krishnan | G02B 27/0006 |
| 2018/0370500 A1 | * | 12/2018 | Garcia Crespo | B60S 1/02 |

(Continued)

FOREIGN PATENT DOCUMENTS

| | | |
|---|---|---|
| CN | 203995596 U | 12/2014 |
| CN | 104325941 B | 1/2017 |

(Continued)

OTHER PUBLICATIONS

ARGO AI Home Page Roof Mounted Sensor POD Tiara Pictures, https://www.argo.ai/[Oct. 3, 2017 11:05:07 AM].

*Primary Examiner* — Gregory A Blankenship

(74) *Attorney, Agent, or Firm* — Frank A. MacKenzie; Bejin Bieneman PLC

(57) ABSTRACT

A system includes a roof mount including a drainage tray, a sensor housing disposed on the roof mount, and a sensor supported by the sensor housing and a fluid spray directed toward the sensor. The sensor is disposed above the drainage tray.

19 Claims, 5 Drawing Sheets

(56) References Cited

U.S. PATENT DOCUMENTS

2019/0016306 A1\* 1/2019 Krishnan .............. B60S 1/0848
2019/0016310 A1\* 1/2019 Matesic .................... B60S 1/56

FOREIGN PATENT DOCUMENTS

| DE | 4230406 A1 | 3/1993 |
| GB | 2206849 A | 1/1989 |
| GB | 2315251 A | 1/1998 |
| KR | 19980038007 U | 9/1998 |

\* cited by examiner

VEHICLE SENSOR CLEANING

BACKGROUND

Vehicles, such as passenger cars, typically include sensors to collect data of a surrounding environment. The sensors can be placed on various parts of the vehicle, e.g., a vehicle roof, a vehicle hood, a rear vehicle door, etc. The sensors, e.g., lens covers, may become dirty during operation of the vehicle. It is a problem to effectively clean sensors and/or sensor lenses or covers, especially when sensor data and/or environmental conditions around a vehicle can be changing and changes can affect sensor operation.

DETAILED DESCRIPTION

Figure 1:
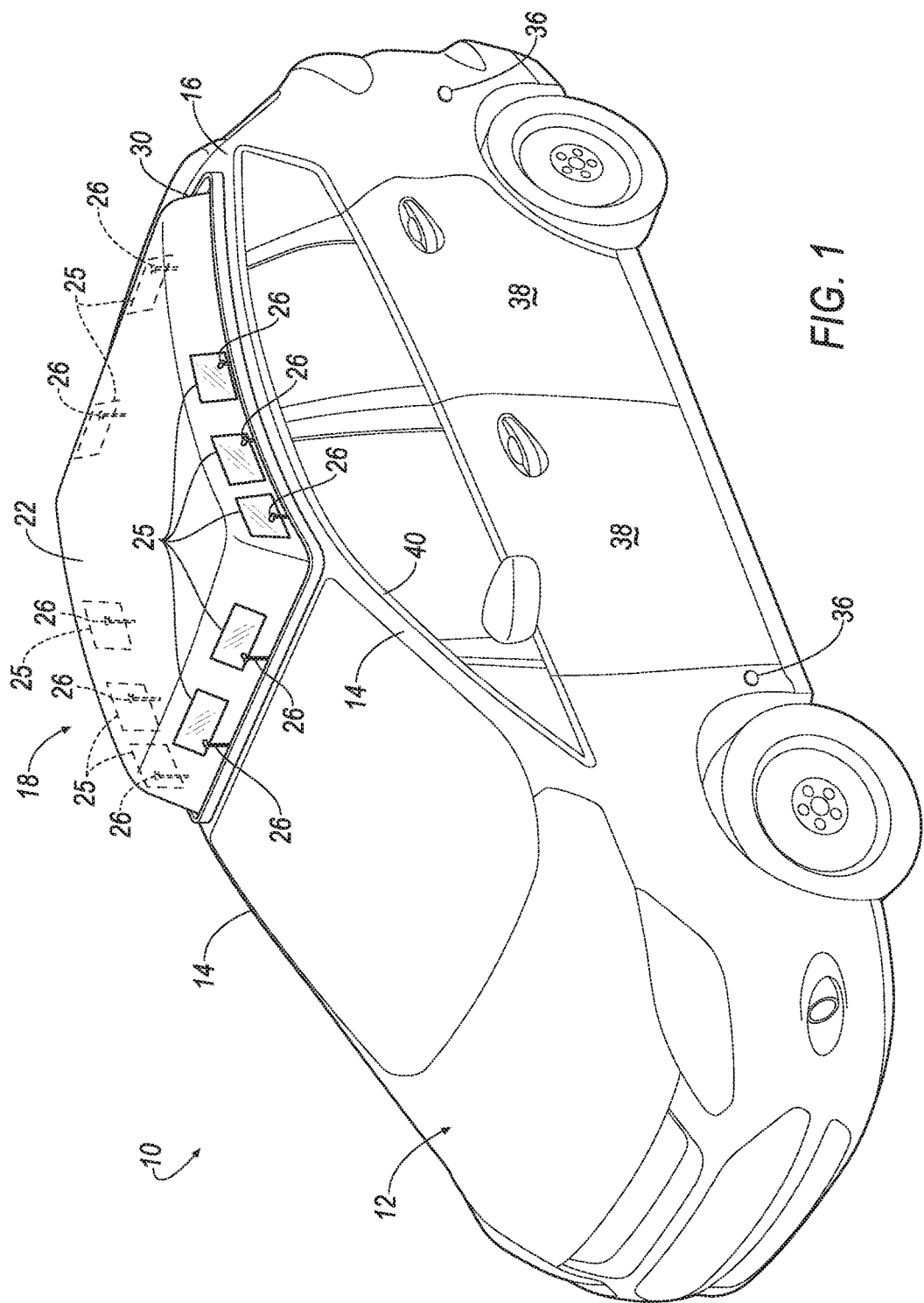
FIG. 1 is a view of an example vehicle including a roof mount.

A system includes a roof mount including a drainage tray, a sensor housing disposed on the roof mount, and a sensor supported by the sensor housing and a fluid sprayer directed toward the sensor, wherein the sensor is disposed above the drainage tray.

The system can further include a tube connected to the drainage tray.

The system can further include a vehicle pillar, wherein the tube can extend along the vehicle pillar.

The system can further include a fluid reservoir connected to the fluid spray.

The drainage tray can extend along a seam between the roof mount and a vehicle door. The system can further include a tube connected to the drainage tray extending along the seam.

The fluid sprayer can be supported by the sensor housing.

The system can further include a second sensor disposed above the drainage tray and a second fluid sprayer supported by the sensor housing.

The system can further include a forward vehicle pillar and a rear vehicle pillar, wherein the sensor housing can extend from the forward vehicle pillar to the rear vehicle pillar.

The drainage tray can include a drain arranged to move fluid away from the roof mount.

A system includes a vehicle pillar, a roof mount including a drainage tray, a sensor housing disposed above the drainage tray, and a tube in communication with the drainage tray extending along the vehicle pillar.

The drainage tray can extend along a seam between the roof mount and a vehicle door.

The system can further include a second vehicle pillar, wherein the sensor housing can extend from the vehicle pillar to the second vehicle pillar.

The drainage tray can include a drain arranged to move fluid away from the roof mount.

The tube can extend along a seam between the roof mount and a vehicle door.

The sensor housing can be disposed above an outer surface of the roof mount.

A system includes a roof mount, means for housing a sensor disposed on the roof mount, means for spraying the housing means with a fluid, means for collecting the sprayed fluid, and means for moving the collected fluid from the roof mount.

The system can further include a vehicle pillar and means for moving the collected fluid along the vehicle pillar.

The housing means can be disposed above an outer surface of the roof mount.

The means for collecting the sprayed fluid can extend along a seam between the roof mount and a vehicle door.

To remove dirt and/or other debris or material from windows protecting vehicle sensors, fluid sprayers can spray cleaning fluid onto the windows. The windows are disposed above a drainage tray that collects the sprayed fluid. The sprayed fluid moves along the drainage tray (e.g., via gravity) and away from the vehicle via tubes connected to exit ports. Incorporating the drainage tray beneath a roof-mounted sensor housing disposes the drainage tray to receive fluid from a plurality of windows. Furthermore, the fluid moves through the tubes away from a vehicle door, preventing spillage of the fluid onto vehicle occupants entering or exiting the vehicle. Thus, the sensors can collect data without disruption from occluding material such as dirt, debris, etc. on the windows.

FIG. 1 is a perspective view of an example vehicle 10. The vehicle 10 can be, e.g., an automobile, including a sedan, a pick-up truck, a sport-utility vehicle, etc. The vehicle 10 can be an autonomous vehicle 10. For example, the vehicle 10 can have a computer (not shown) that may control the operations of the vehicle 10 in an autonomous mode, a semi-autonomous mode, or a non-autonomous mode. For purposes of this disclosure, an autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle propulsion, braking, and steering.

The vehicle 10 includes a vehicle body 12. The vehicle body 12 includes two forward vehicle pillars 14 and two rear vehicle pillars 16. The body 12 can be a unibody construction, i.e., a unitary-body construction. In the unibody construction, the body 12 is unitary, i.e., although the body 12 can be assembled from various pieces, the vehicle 10 does not have a frame apart from the body 12. As another example not shown in the Figures, the body 12 and a frame of the vehicle 10 can have a body-on-frame construction (also referred to as a cab-on-frame construction). In other words, the body 12 and frame are separate components, i.e., are modular, and the body 12 is supported on and affixed to the frame. The body 12 and/or the frame can be formed of any suitable material, for example, steel, aluminum, etc.

The vehicle 10 includes a roof 18. The roof 18 is supported by the vehicle pillars 14, 16. The roof 18 can protect vehicle 10 occupants from, e.g., rain, snow, wind, sun, etc. The roof 18 can support one or more components, e.g., a moon roof, a sensor 24, etc., for operation of the vehicle 10.

Figure 2:
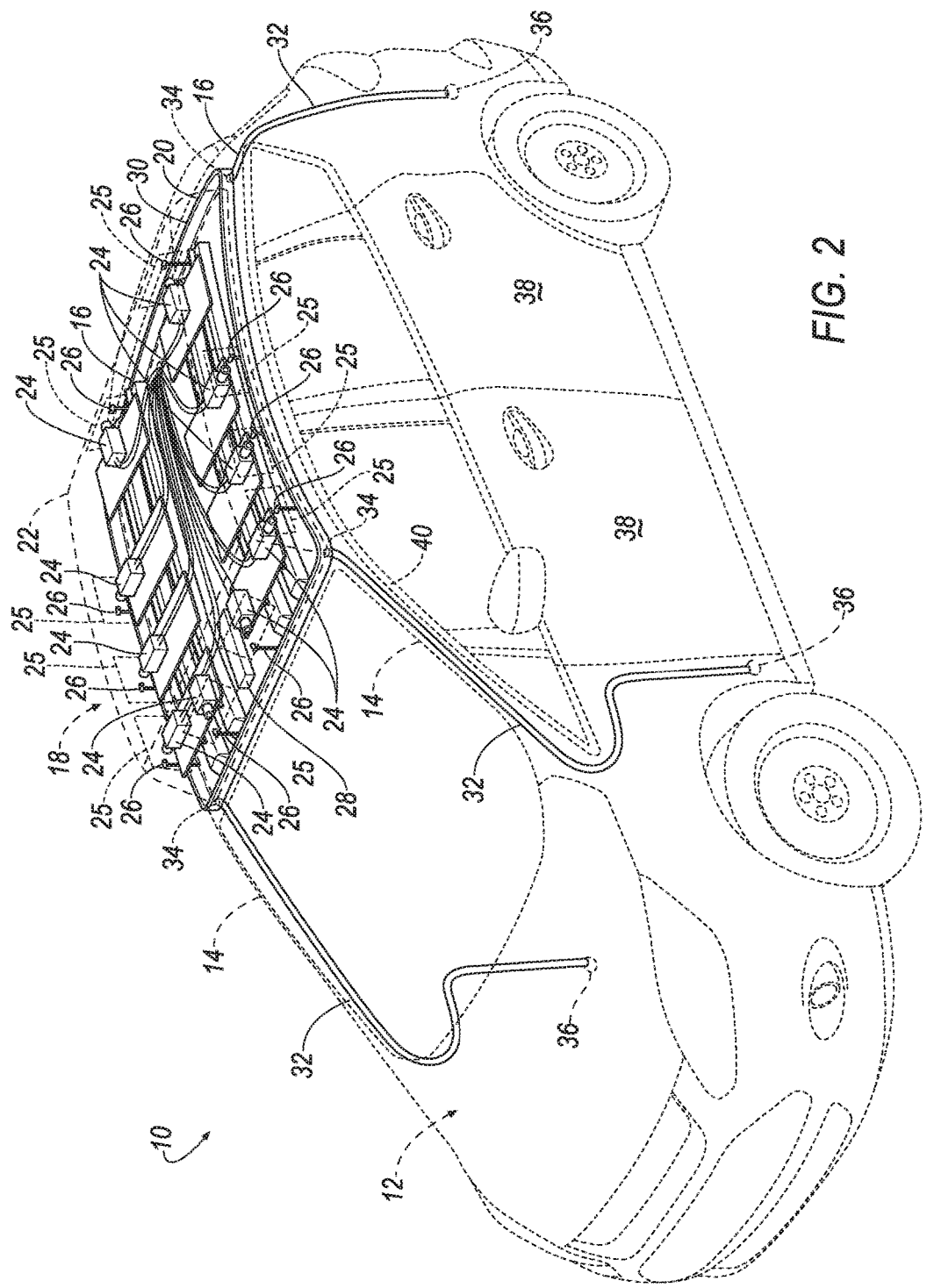
FIG. 2 is a view of the example vehicle with sensors on the roof mount.
Figure 3:
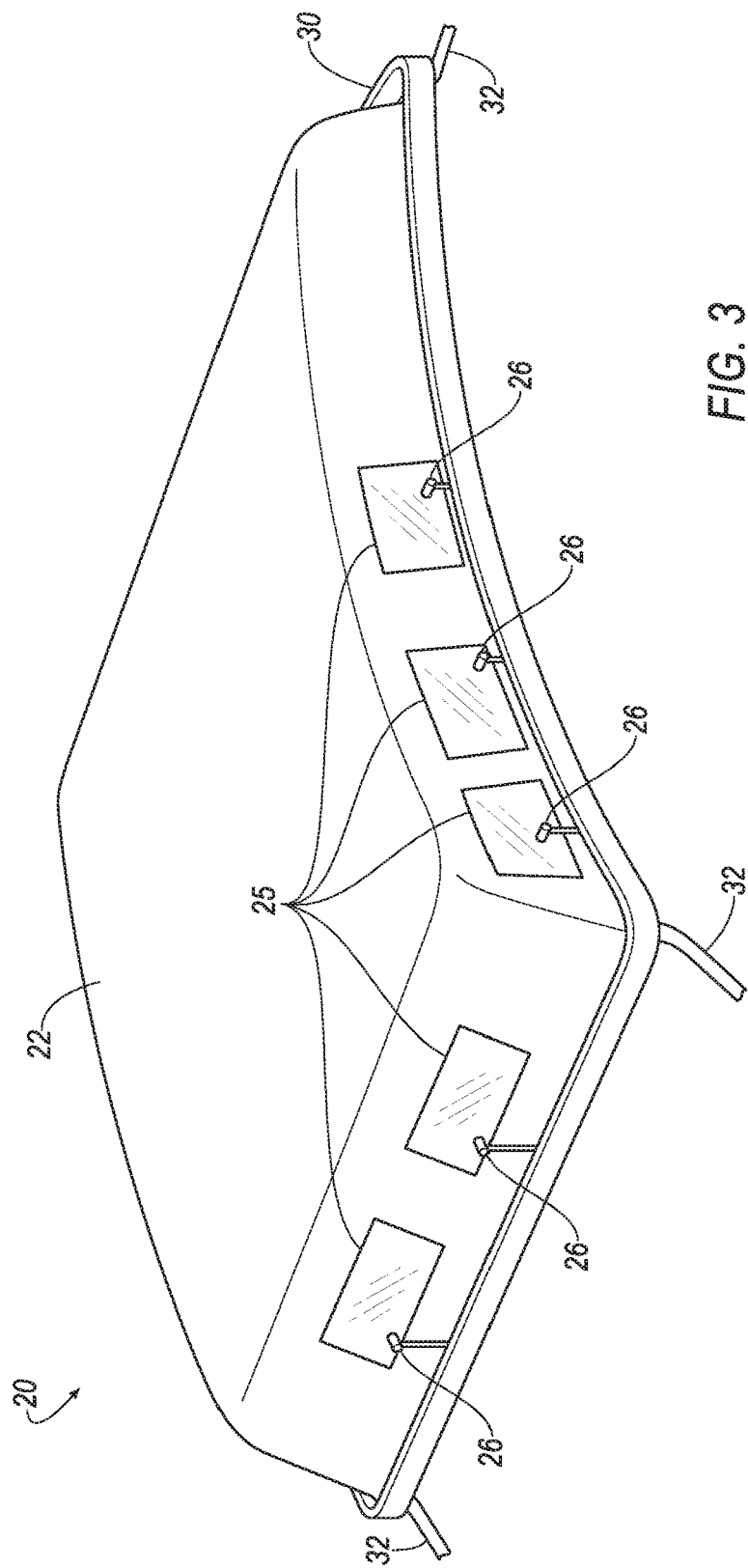
FIG. 3 is a view of the example roof mount of FIG. 1.
Figure 4:
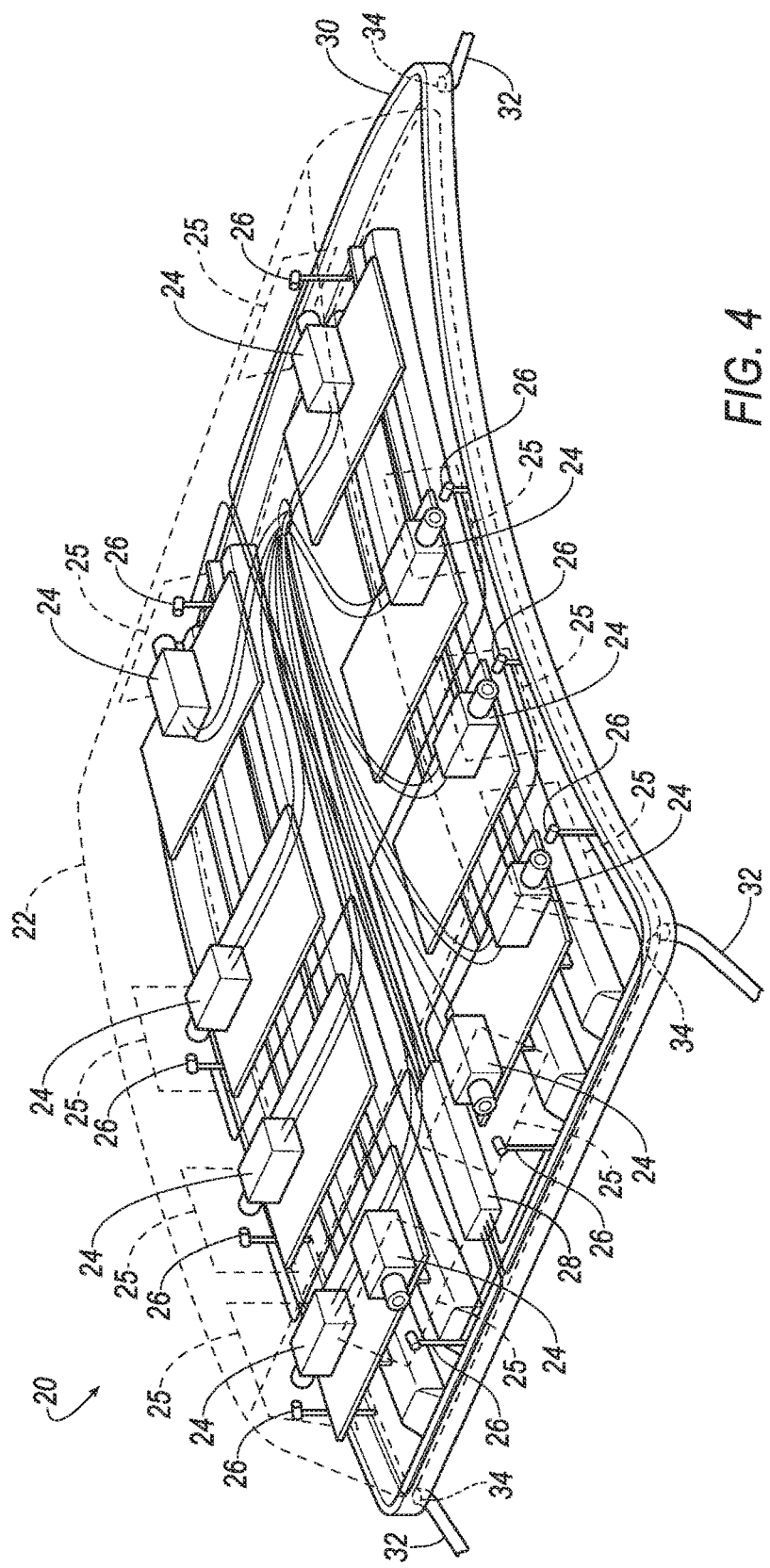
FIG. 4 is a view of the example roof mount of FIG. 2 showing the sensors.

The vehicle 10 as shown in FIGS. 1-2 includes a roof mount 20. FIGS. 3-4 illustrate the roof mount 20 in more detail. The roof mount 20 is a structure typically attachable to the vehicle body 12. The roof mount 20 provides support for one or more vehicle components, e.g., a sensor housing, a sprayer, etc. The roof mount 20 can be separable from the vehicle pillars 14, 16, e.g., so that a second roof mount 20 can replace a first roof mount 20 and can be affixed to the vehicle body 12 to support different components, e.g., a second set of sensors 24. When the roof mount 20 is attached to the vehicle body 12 without an additional frame or bracket, the roof mount 20 defines the roof 18. Alternatively, the vehicle body 12 can include a bracket (not shown) attached to the pillars 14, 16, and the roof mount 20 combined with the bracket to define the roof 18. The roof mount 20 can be attached to the vehicle body 12 with, e.g., fasteners, welds, adhesives, etc.

The roof mount 20 includes the sensor housing 22, as shown in FIGS. 1-4. The sensor housing 22 is a support structure or the like that can house a plurality of sensors 24, e.g., one or more cameras and one or more lidar sensors. The sensor housing 22 can secure the sensors 24 in a fixed orientation to collect data in a specific direction relative to the vehicle 10. The sensor housing 22 can be fixed to the roof mount 20. The sensor housing 22 can extend along the roof 18 from the forward pillars 14 to the rear pillars 16. The sensor housing 22 can be disposed above an outer surface of the roof mount 20, i.e., facing away from an interior cabin of the vehicle 10. When the sensor housing 22 is disposed above the outer surface of the roof mount 20, the sensors 24 supported by the sensor housing 22 can collect data from an area around the vehicle 10. Furthermore, when the sensor housing 22 is disposed above the outer surface of the roof mount 20, the field of view of the sensors 24 can be substantially free of the vehicle body 12.

The roof mount 20 includes at least one sensor 24, as shown in FIGS. 2 and 4. The sensors 24 are supported by the sensor housing 22. The sensors 24 can be arranged to be aligned with the vehicle body 12 or otherwise oriented in a specific manner to collect data around the vehicle 10. Alternatively or additionally, one or more sensors 24 can be attached to a movable platform (not shown) that moves the sensor 24 to a different field of view, e.g., one of the sensors 24 can be attached to a rotating platform that rotates the field of view of the sensor 24, allowing the sensor 24 to collect data over a greater area than a fixed sensor 24. The sensors 24 may include, by way of example and not limitation, lidar, radar, vision systems, microphones, radio-frequency directional antennas, and directional ultrasonic sensors. The sensors 24 can be positioned behind windows 25. The windows 25 can collect dirt, reducing the amount of data and/or the precision of the data collected by the sensors 24. As used herein, "dirt" can be any material that occludes the windows 25 (i.e., reduces the amount of data and/or the precision of the data collected by the sensors 24 through the windows 25), e.g., dirt, dust, sand, grime, precipitation, moisture (e.g., fog, dew), etc.

By securing the sensors 24 in the sensor housing 22 on the roof mount 20, the vehicle 10 can operate components in the autonomous and semi-autonomous modes. For example, if the sensors 24 are lidar sensors, the sensors 24 can collect data in front of the vehicle 10, and the computer in the vehicle 10 can use the data from the sensors 24 to operate vehicle components, e.g., the propulsion, the brake, the steering, etc., to move the vehicle 10 along a roadway. Furthermore, by securing the sensor housing 22 to the vehicle roof 18, the sensors 24 can have an increased field of view and typically can collect more data compared to securing the sensors 24 to other parts of the vehicle 10.

The sensor housing 22 includes at least one and typically a plurality of windows 25. The windows 25 can protect the sensors 24 from occluding material, e.g., dirt. The windows 25 are transparent, allowing light to travel to and from the sensors 24 through the windows 25. Thus, the sensors 24 collect data through the windows 25. Each sensor 24 is positioned behind a respective window 25.

Figure 5:
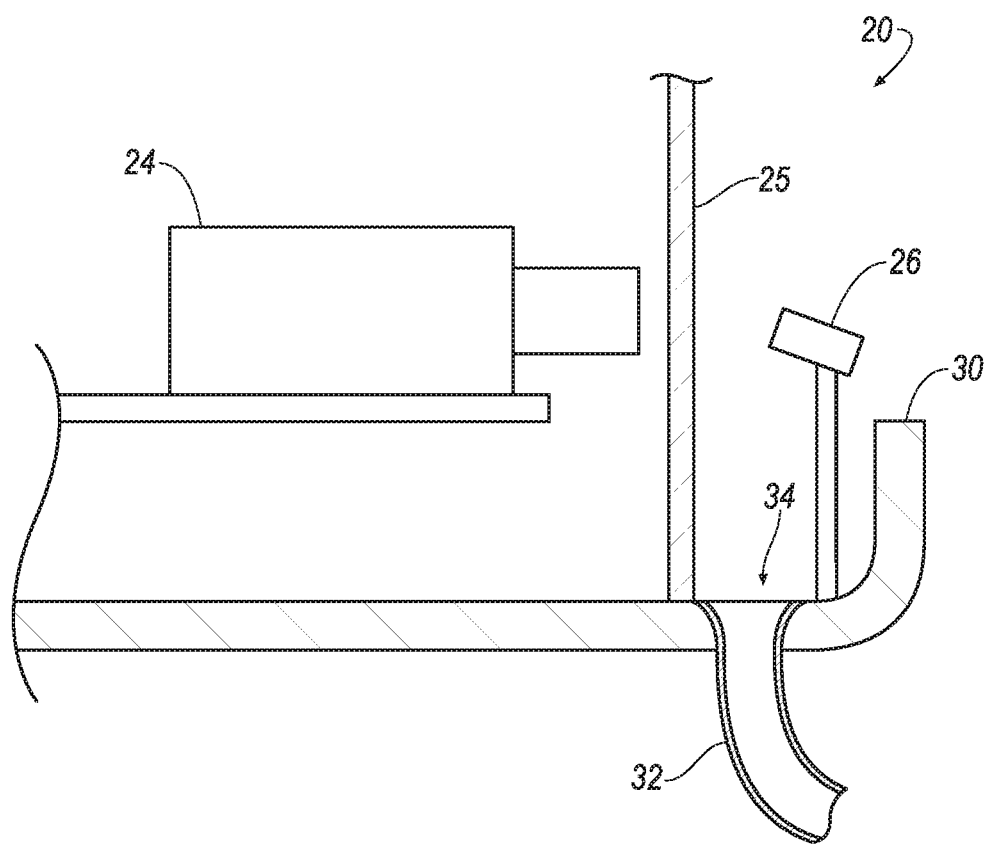
FIG. 5 is a side view of an example sensor and a fluid sprayer.

The roof mount 20 includes fluid sprayers 26, as shown in FIGS. 2 and 4-5. The fluid sprayers 26 spray fluid onto the windows 25, cleaning dirt from the windows 25 and allowing the sensors 24 to collect data through the windows 25. The fluid sprayers 26 can receive cleaning fluid from a fluid reservoir 28 connected to the fluid sprayers 26. The fluid sprayers 26 can be directed toward the windows 25 so that fluid sprayed from the fluid sprayers 26 removes dirt from the windows 25. Upon removing the dirt with the sprayed fluid, the sensors 24 can collect data through the windows 25 for use by the computer of the vehicle 10. The fluid sprayers 26 can be disposed in the sensor housing 22, as shown in FIG. 2. The windows 25 are disposed between the fluid sprayers 26 and the sensors 24 so that the fluid sprayers 26 can spray cleaning fluid onto the windows 25.

The roof mount 20 includes a drainage tray 30, as shown in FIGS. 1-5. The drainage tray 30 is supported by the roof mount 20 and disposed beneath the sensor housing 22. For example, the drainage tray 30 can extend around a periphery of the sensor housing 22. The drainage tray 30 can be shaped to collect fluid from the sensor housing 22. For example, the drainage tray 30 can be sloped so that collected fluid, after it is sprayed from the fluid sprayers 26 onto the windows 25, can move to one or more specific locations, e.g., the front pillars 14, the rear pillars 16, etc. In another example, the drainage tray 30 can include a raised lip that prevents fluid from spilling away from the drainage tray 30.

The roof mount 20 can include at least one tube 32 extending from the drainage tray 30. In the example of FIGS. 1-4, the roof mount 20 includes four tubes 32, of which three are shown. The tube 32 can be a flexible or rigid tube, e.g., formed of aluminum, a synthetic rubber, etc., that moves collected fluid from the drainage tray 30. The tube 32 can extend along one of the vehicle pillars 14, 16 so that the fluid moves away from the roof mount 20. If the vehicle 10 includes a central vehicle pillar (or pillars) between the forward vehicle pillars 14 and the rear vehicle pillars 16 (not shown), a tube 32 can extend along a central vehicle pillar.

As shown in FIGS. 2 and 4-5, the drainage tray 30 can include a drain 34. The vehicle 10 can include an exit port 36 directed away from the vehicle 10, as shown in FIGS. 1-2. The tube 32 can connect the drain 34 and the exit port 36, and the fluid moves from the drainage tray 30 away from the vehicle 10. The exit port 36 can be located on, e.g., an underbody of the vehicle 10, the vehicle pillars 14, 16, etc. As shown in FIGS. 1-2, the vehicle 10 includes four exit ports 36 (three of which are shown) on the side of the vehicle 10. Fluid sprayed from the sprayers 26 onto the windows 25 drains into the drainage tray 30, moves down the drains 34 along the tubes 32, and flows out through the exit ports 36 and away from the vehicle 10.

As shown in FIGS. 1-2, the vehicle 10 includes at least one door 38. The door 38 is attached to the body 12. FIG. 1 shows the vehicle 10 including two doors 38, and the vehicle 10 can include two additional doors 38 on an opposing side of the vehicle 10 and a rear door 38 to the vehicle 10 trunk (for a total of five doors 38), not shown in the view of FIG. 1. Alternatively, the vehicle 10 can have a different number of doors 38, e.g., two doors 38, three doors 38, etc. The door 38 allows ingress and egress of vehicle 10 occupants. The door 38 and the roof mount 20 can meet at a seam 40. The seam 40 is defined where the door 38 meets the roof mount 20. The drainage tray 30 and the tube 32 can extend along the seam 40.

The drainage tray 30 and the tubes 32 allow the sprayed fluid to move away from the roof 18. Thus, the drainage tray 30 can prevent the sprayed fluid from flowing onto vehicle 10 occupants entering or exiting the vehicle 10 with the doors 38. Furthermore, because the drainage tray 30 extends along the seam 40 between the doors 38 and the roof mount 20, the fluid sprayers 26 can spray fluid along the roof mount 20 and the fluid can move in the drainage tray 30 away from the vehicle doors 38.

A computer (not shown) in the vehicle 10 can collect data with the sensors 24 to operate vehicle 10 components in an autonomous or semi-autonomous mode. When the windows 25 protecting the sensors 24 are dirty, i.e., dirt or other occluding material is present on the windows 25, the occluding material can reduce the data and/or the quality of data collected by the sensors 24 through the windows 25, the computer can actuate the fluid sprayers 26 to spray cleaning fluid from the fluid reservoir 28 onto the windows 25. The cleaning fluid can remove the dirt from the windows 25, and the sensors 24 can collect data without occlusion from the dirt through the windows 25 (i.e., the material no longer reduces the amount and/or quality of the data collected). Upon removing the occluding material, the fluid can drip into the drainage tray 30. The fluid can move along the drainage tray 30 to one of the drains 34, where the fluid moves via gravity through one of the tubes 32 to one of the exit ports 36, exiting the fluid from the vehicle 10. Furthermore, the drainage tray 30 can move the fluid away from the vehicle doors 38, preventing the fluid from splashing onto occupants entering or exiting the vehicle 10. Thus, the fluid sprayers 26 can clean the windows 25 while the sprayed fluid moves away from the vehicle 10.

FIG. 5 illustrates one example sensor 24, one example window 25, and one example fluid sprayer 26 of the roof mount 20. The fluid sprayer 26 is directed at the window 25 and supported by the drainage tray 30. The fluid sprayer 26 sprays fluid onto the window 25. As the fluid drips from the window 25, the fluid drips into the drainage tray 30. The fluid moves along the drainage tray 30 to one of the drains 34 and down one of the tubes 32. The drainage tray 30 includes a lip to prevent fluid from spilling away from the drainage tray 30 and onto another part of the roof 18 and/or onto the vehicle door 38. The fluid sprayer 26 can be positioned so that the fluid sprayed from the fluid sprayer 26 drips only into the drainage tray 30 and not onto another part of the roof 18 and/or onto the vehicle door 38. The example of FIG. 5 shows one sensor 24 with one fluid sprayer 26 and one window, and the roof mount 20 can include a plurality of sensors 24 each with a respective fluid sprayer 26 and a respective window 25.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising:
a roof mount including a drainage tray extending along a seam between the roof mount and a vehicle door;
a sensor housing disposed on the roof mount; and
a sensor supported by and disposed within the sensor housing and a fluid sprayer directed toward the sensor and extending from the drainage tray;
wherein the sensor is disposed above the drainage tray.

2. The system of claim 1, further comprising a tube connected to the drainage tray.

3. The system of claim 2, further comprising a vehicle pillar, wherein the tube extends along the vehicle pillar.

4. The system of claim 1, further comprising a fluid reservoir connected to the fluid sprayer.

5. The system of claim 1, further comprising a tube connected to the drainage tray extending along the seam.

6. The system of claim 1, wherein the fluid sprayer is supported by the sensor housing.

7. The system of claim 1, further comprising a second sensor disposed above the drainage tray within the sensor housing and a second fluid sprayer extending from the drainage tray.

8. The system of claim 1, further comprising a forward vehicle pillar and a rear vehicle pillar, wherein the sensor housing extends from the forward vehicle pillar to the rear vehicle pillar.

9. The system of claim 1, wherein the drainage tray includes a drain arranged to move fluid away from the roof mount.

10. A system, comprising:
a vehicle pillar;
a roof mount including a drainage tray;
a sensor housing supported by the drainage tray; and
a tube in communication with the drainage tray extending along the vehicle pillar.

11. The system of claim 10, wherein the drainage tray extends along a seam between the roof mount and a vehicle door.

12. The system of claim 10, further comprising a second vehicle pillar, wherein the sensor housing extends from the vehicle pillar to the second vehicle pillar.

13. The system of claim 10, wherein the drainage tray includes a drain arranged to move fluid away from the roof mount.

14. The system of claim 10, wherein the tube extends along a seam between the roof mount and a vehicle door.

15. The system of claim 10, wherein the sensor housing is disposed above an outer surface of the roof mount.

16. A system, comprising:
a roof mount;
means for housing a sensor disposed on the roof mount;
means for spraying the housing means with a fluid;
means for collecting the sprayed fluid, wherein the spraying means is supported by the collecting means; and
means for moving the collected fluid from the roof mount.

17. The system of claim 16, further comprising a vehicle pillar and means for moving the collected fluid along the vehicle pillar.

18. The system of claim 16, wherein the housing means is disposed above an outer surface of the roof mount.

19. The system of claim 16, wherein the means for collecting the sprayed fluid extends along a seam between the roof mount and a vehicle door.

\* \* \* \* \*